(12) United States Patent
Zhang et al.

(10) Patent No.: US 9,386,452 B2
(45) Date of Patent: Jul. 5, 2016

(54) ACCESS CONTROL METHOD AND APPARATUS FOR USER EQUIPMENT

(71) Applicant: Huawei Technologies Co., LTD, Shenzhen (CN)

(72) Inventors: Yanping Zhang, Shanghai (CN); Shufeng Shi, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 293 days.

(21) Appl. No.: 13/931,844

(22) Filed: Jun. 29, 2013

(65) Prior Publication Data

US 2014/0010203 A1 Jan. 9, 2014

Related U.S. Application Data

(63) Continuation of application No. PCT/CN2010/080671, filed on Dec. 31, 2010.

(51) Int. Cl.
*H04L 12/50* (2006.01)
*H04W 12/08* (2009.01)
*H04W 48/02* (2009.01)

(52) U.S. Cl.
CPC .............. *H04W 12/08* (2013.01); *H04W 48/02* (2013.01)

(58) Field of Classification Search
USPC ........................................................ 370/331
See application file for complete search history.

(56) References Cited

U.S. PATENT DOCUMENTS

| | | |
|---|---|---|
| 2009/0047960 A1 | 2/2009 | Gunnarsson et al. |
| 2010/0075635 A1* | 3/2010 | Lim et al. ................ 455/411 |
| 2010/0161794 A1 | 6/2010 | Horn et al. |
| 2011/0223887 A1* | 9/2011 | Rune et al. .............. 455/411 |
| 2011/0237250 A1* | 9/2011 | Horn et al. .............. 455/433 |
| 2012/0164979 A1* | 6/2012 | Bachmann et al. ...... 455/411 |

FOREIGN PATENT DOCUMENTS

| | | |
|---|---|---|
| CN | 101730102 | 6/2010 |
| WO | WO 2010/059122 | 5/2010 |
| WO | WO 2010/072035 | 7/2010 |
| WO | WO 2010/151805 | 12/2010 |

OTHER PUBLICATIONS

International Search Report received in Application No. PCT/CN2010/080671 mailed Oct. 20, 2011, 4 pages.

3rd Generation Partnership Project; Technical Specification Group Services and System Aspects; General Packet Radio Service (GPRS); Service description; Stage 2 (Release 10), 3GPP TS 23.060 V10.2.0, Dec. 2010, 316.

(Continued)

*Primary Examiner* — Edan Orgad
*Assistant Examiner* — Sithu Ko
(74) *Attorney, Agent, or Firm* — Slater Matsil, LLP

(57) ABSTRACT

An access control method and apparatus for a user equipment relate to the field of communications technologies. The method includes sending a first message to a CSG server; receiving a second message that is sent by the CSG server and includes access control information of a user equipment; and performing access control on the user equipment according to the access control information of the user equipment.

12 Claims, 4 Drawing Sheets

(56) References Cited

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access (Release 10), 3GPP TS 23.401 V10.2.0, Dec. 2010, 276 pages.

3rd Generation Partnership Project ; Technical Specification Group Core Network and Terminals; Evolved Packet System (EPS); Mobility Management Entity (MME) and Serving GPRS Support Node (SGSN) related interfaces based on Diameter protocol (Release 10), 3GPP TS 29.272 V10.1.0, Dec. 2010, 92 pages.

Extended European Search Report received in Application No. 10861397.7-1854 mailed Jan. 3, 2014, 14 pages.

Vodafone, et al., Summary of offline Discussions on RAN sharing for H(e)NB, 3GPP TSG RAN WG2 #72, R2-106914, Jascksonville, USA, Nov. 15-19, 2010, 3 pages.

\* cited by examiner

ACCESS CONTROL METHOD AND APPARATUS FOR USER EQUIPMENT

CROSS-REFERENCE TO RELATED APPLICATIONS

This application is a continuation of International Application No. PCT/CN2010/080671, filed on Dec. 31, 2010, which is hereby incorporated by reference in its entirety.

TECHNICAL FIELD

The present invention relates to the field of communications technologies, and, in particular, to an access control method and apparatus for a user equipment.

BACKGROUND

At present, when a UE (User Equipment) accesses a mobile network through an access network element, a CSG (closed subscriber group) mechanism is introduced to restrict a UE from accessing a particular access network element. In the CSG mechanism, a CSG identifies a group of UEs (or users, user). These UEs are allowed to access one or more cells of an operator, but other UEs are prevented from accessing these cells. One CSG area contains one or more cells, and all the cells contained in the CSG area are identified by one CSG ID. One CSG area is restricted to access of one group of UEs and restricts a UE other than those of this group from accessing. For one UE, CSG IDs of all CSG areas that can be accessed by the UE forms an allowed CSG list (Allowed CSG List), which can also be referred to as a CSG white list.

When the CSG mechanism is used to perform access management on a UE, access network elements accessed by the UE have three modes: an open mode, a hybrid mode, and a closed mode. When the UE seeks access through each of access network elements in the preceding three access modes, a mobility management network element obtains the allowed CSG list in user subscription data from an HSS (Home Subscriber Server, home subscriber server), and, according to the CSG ID of a cell currently accessed by the UE, an access mode of an access network element, and the allowed CSG list in the user subscription data, judges whether to allow access of the UE. Specifically, if the UE seeks access through a cell under an access network element in open mode, a network side allows access of the UE, if the UE seeks access through a cell under an access network element in hybrid mode, when resources are sufficient on the network side, the network side allows the UE to access; when resources are insufficient on the network side, the network side obtains the allowed CSG list in the user subscription data from the HSS when the UE seeks access, and judges whether the CSG ID of the cell accessed by a user is in the allowed CSG list in the user subscription data: if yes, access of the user is allowed; otherwise, access of the user is not allowed, and if the user seeks access through a cell under an access network element in closed mode, the network side judges whether the CSGID of the cell accessed by the user is in the allowed CSG list in the user subscription data: If yes, access of the user is allowed; otherwise, access of the user is not allowed.

At present, a part of the user subscription data is related to a PLMN (public land mobile network). When a UE accesses a network, a mobility management network element obtains only subscription data of a PLMN to which the mobility management network element belongs and performs access control on the user. However, when PLMN1 corresponding to a cell currently accessed by the UE is inconsistent with PLMN2 corresponding to a target cell to which the UE is to hand over, a source mobility management network element cannot perform access control on the UE.

In this case, if the source mobility management network element refuses to perform a handover in this situation, the UE can never hand over to the target cell to obtain service of the target cell. Because the handover generally occurs in a situation that the UE can no longer obtain service of a high-quality service from the current cell, if the UE cannot obtain the service of the target cell, the UE has to stay in a cell with poor service quality. As a result, many services cannot be implemented.

If the mobility management network element always allow the UE to hand over in this situation, the access control on the UE can be performed in the target cell only when the handover is completed; that is, the target cell has already allocated all bearer resources for the UE, and handover signaling interaction has already be completed. If the target network verifies that the UE cannot access the target cell, the resources already allocated for the UE will be taken back, thereby causing a waste of bearer resources; and earlier handover signaling becomes useless, thereby causing a waste of signaling resources. In addition, because the UE has already moved away from the original cell and cannot access the target cell, the UE has to perform cell reselection to find an appropriate network. In this way, a network access delay of the UE is increased, and a service cannot recover timely, which affects the user's experience.

SUMMARY OF THE INVENTION

Embodiments of the present invention provide an access control method and apparatus for a user equipment to solve a problem in the prior art that a mobility management network element cannot perform access control on a UE when a PLMN corresponding to a cell where the UE is currently located is different from a PLMN corresponding to a target cell to be accessed by the UE.

To achieve the preceding purpose, the embodiments of the present invention adopt the following technical solutions.

An access control method for a user equipment is disclosed. The method is implemented by a mobility management network element and includes sending a first message to a CSG server (CSG server), receiving a second message that is sent by the CSG server and includes access control information of a user equipment, and according to the access control information of the user equipment, performing access control on the user equipment or sending the access control information of the user equipment to an access network element.

In the present invention, the performing the access control can be as follows. If it is judged that a user equipment is allowed to access a target cell, a handover procedure is performed to hand over the user equipment to the target cell. If it is judged that the user equipment is not allowed to access the target cell or hand over to the target cell, handover is not performed or a handover failure message is sent to the access network element.

An access control method for a user equipment is implemented by a CSG server and includes receiving a first message sent by a mobility management network element, obtaining access control information of a user equipment according to preconfigured user subscription data, and sending, to the mobility management network element, a second message including the access control information of the user equipment.

A mobility management network element includes a sending unit, which is configured to send a first message to a CSG server, a receiving unit, configured to receive a second message that is sent by the CSG server and includes access control information of a user equipment. A control unit is configured to, according to the access control information of the user equipment, perform access control on the user equipment or send the access control information of the user equipment to an access network element.

A CSG server that saves user subscription data and includes a receiving unit is configured to receive a first message sent by a mobility management network element. An obtaining unit is configured to obtain access control information of a user equipment according to preconfigured user subscription data. A sending unit is configured to send, to the mobility management network element, a second message including the access control information of the user equipment.

In the embodiments of the present invention described in the preceding technical solutions, the mobility management network element may obtain the access control information of the user equipment from the CSG server and perform the access control on the user equipment according to the access control information of the user equipment. Compared with the prior art, embodiments of the present invention can solve the problem in the prior art that the mobility management network element cannot perform the access control on the UE when a PLMN corresponding to the cell where the UE is currently located is different from a PLMN corresponding to the target cell to be accessed by the UE.

BRIEF DESCRIPTION OF THE DRAWINGS

To illustrate the technical solutions in the embodiments of the present invention or in the prior art more clearly, the following briefly describes accompanying drawings required for describing the embodiments or the prior art. Apparently, the accompanying drawings in the following descriptions merely show some embodiments of the present invention, and persons of ordinary skill in the art can derive other drawings from these accompanying drawings without creative efforts.

DETAILED DESCRIPTION OF ILLUSTRATIVE EMBODIMENTS

Figure 1:
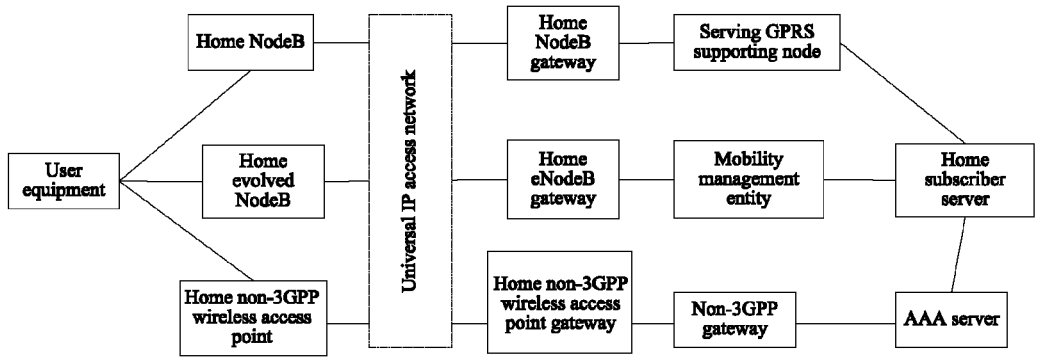
FIG. 1 is a structural diagram of a home access system architecture according to an embodiment of the present invention.

At present, if a UE (User Equipment) accesses a mobile network through a home wireless access point, a home access system architecture shown in FIG. 1 can be adopted.

In the architecture, a home NodeB (HNB) is a home wireless access point that operates in a spectrum of a UTRAN (UMTS Territorial Radio Access Network). A home evolved NodeB (HeNB) is a home wireless access point that operates in a spectrum of a E-UTRAN (Evolved UMTS Territorial Radio Access Network, Evolved UMTS Territorial Radio Access Network). A home non-3GPP wireless access point (Home non-3GPP Wireless Access Point, Home non-3GPP WAP) is a home wireless access point that operates in a spectrum of a non-3GPP network. The non-3GPP network includes: CDMA (code division multiple access network), Wimax (Worldwide Interoperability for Microwave Access), WLAN (Wireless Local Area Network), HRPD (High Rate Packet Data), or the like.

A home NodeB gateway (HNB GW), a home eNodeB gateway (HeNB GW), and a home non-3GPP wireless access point gateway (Home non-3GPP WAP GW) are gateway network elements for home wireless access points that connect to the HNB, the HeNb, and the Home non-3GPP WAP through a universal IP access network, respectively.

These gateway network elements for the home wireless access points have functions such as performing management and access control on home wireless access points, converging the home wireless access points, and routing and forwarding signaling data between the home wireless access points and network elements in mobile networks. The network elements in mobile networks include a Serving GPRS Supporting Node (SGSN) in the GPRS/UMTS, a mobility management entity (MME) in the E-UTRAN, and a non-3GPP gateway (non-3GPP GW) in a non-3GPP network. The non-3GPP gateway includes an evolved packet data gateway (EPDG) in the WLAN, an access service network gateway (ASN GW) in the Wimax, an access gateway (AGW) in the CDMA, and a high rate packet data serving gateway (HSGW) in the HRPD, and so on.

A home subscriber server (HSS) is configured to store the subscription information of a UE. An AAA server (authentication, authorization and accounting server) is configured to perform functions of access authentication, authorization and accounting on a UE.

A CSS (CSG Subscriber Server or CSG server) is specially configured to store CSG subscription data information of a user. The CSS may save only CSG subscription data information of a roaming user. Alternatively, when the HSS does not save CSG subscription data information of a local user (that is, a local operator or PLMN), the CSS may further save the CSG subscription information of the local user. The CSG subscription information includes a list of CSGs which a user is allowed to access and may further include a list of APNs (Access Point Name) that the user can access when accessing the CSG.

In the present invention, a CSG server is a server that stores user subscription data, may be a CSS, and may also be an HSS, or another server that stores the user subscription data, for example, an HLR (Home Location Register, home location register), which is not described in detail in the present invention.

FIG. 1 shows only one of home access system architectures. In another home access system architecture, the preceding home wireless access point may directly connect to a network element in a mobile network.

In an application scenario provided in an embodiment of the present invention, an access network element includes an eNB, a Home eNB, or a Home eNB GW; and a mobility management network element (Mobility Management Node, MMN) includes an MME (Mobility Management Entity, mobility management entity) in an E-UTRAN network and an SGSN in a UTRAN network.

Figure 2:
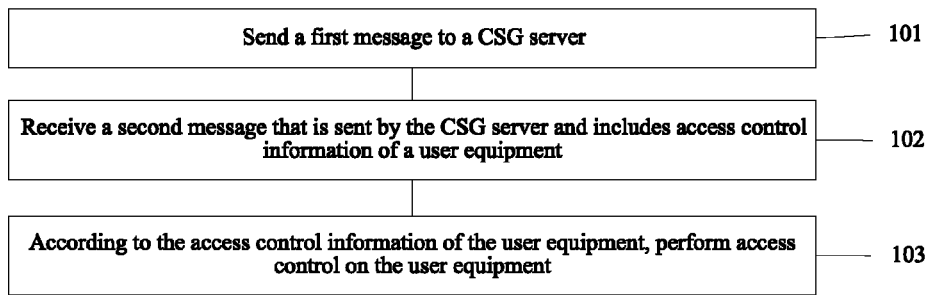
FIG. 2 is a flowchart of an access control method for a user equipment according to an embodiment of the present invention.

As shown in FIG. 2, an embodiment of the present invention provides an access control method for a user equipment. The method is implemented on the side of a mobility management network element and includes the following steps.

101. Send a first message to a CSG server, where the first message includes a PLMN list and a PLMN ID of a target cell or does not include a PLMN ID.

102. Receive a second message that is sent by the CSG server and includes access control information of a user equipment.

103. According to the access control information of the user equipment, perform access control on the user equipment or send the access control information of the user equipment to an access network element.

In the present invention, performing the access control on the user equipment is specifically as follows. If it is judged that the user equipment is not allowed to access the target cell or hand over to a target cell, a mobility management network element refuses a handover or sends a handover failure message to the access network element. If it is judged that the user equipment is allowed to access the target cell or hand over to the target cell, the mobility management network element hands over the user equipment to the target cell.

Figure 3:
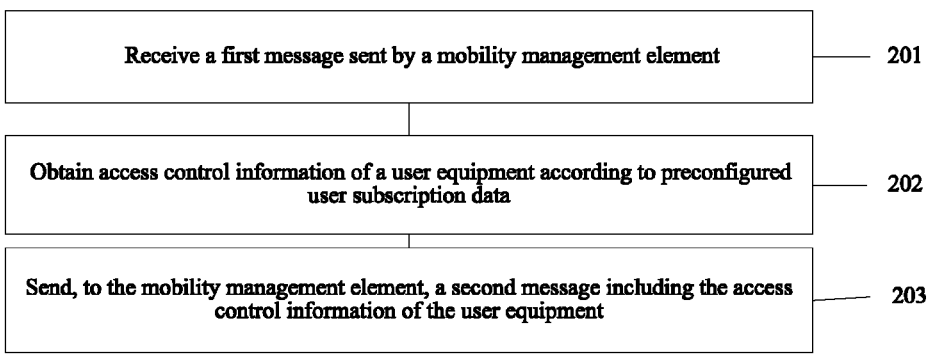
FIG. 3 is a flowchart of another access control method for a user equipment according to an embodiment of the present invention.

Accordingly, as shown in FIG. 3, an embodiment of the present invention provides an access control method for a user equipment. The method is implemented by a CSG server and includes the following steps.

201. Receive a first message sent by a mobility management network element, where the first message includes a PLMN list and a PLMN ID of a target cell or does not include a PLMN ID.

202. Obtain access control information of a user equipment according to preconfigured user subscription data.

203. Send, to the mobility management network element, a second message including the access control information of the user equipment.

In the embodiment of the present invention, the mobility management network element can obtain the access control information of the user equipment from the CSG server and perform the access control on the user equipment according to the access control information of the user equipment. Compared with the prior art, the embodiment of the present invention can solve a problem in the prior art that the mobility management network element cannot perform the access control on the UE when a PLMN corresponding to the cell where the UE is currently located is different from a PLMN corresponding to the target cell to be accessed by the UE.

Figure 4:
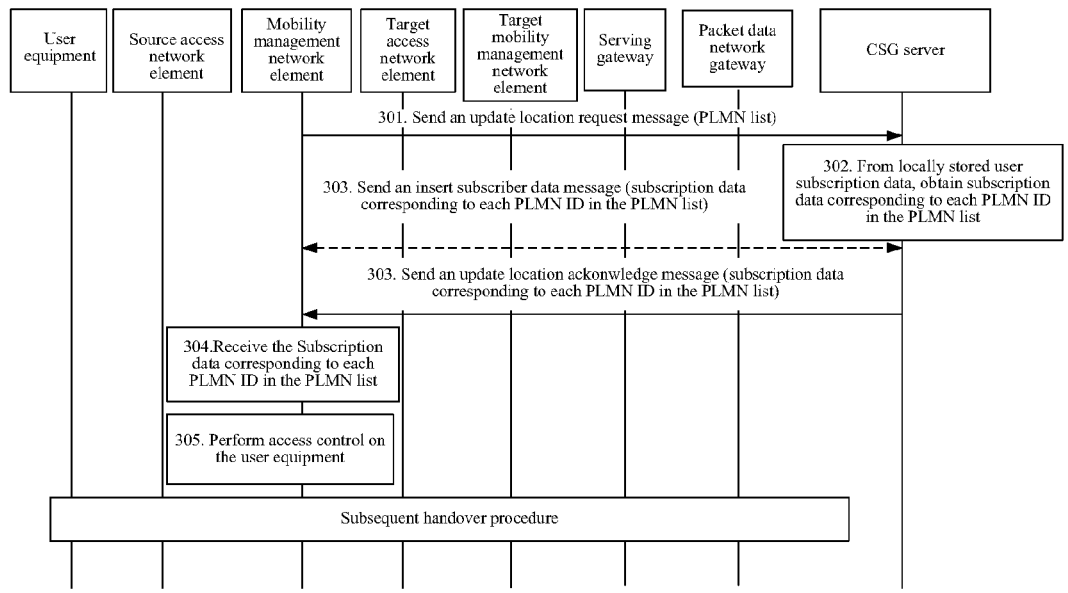
FIG. 4 is a flowchart of another access control method for a user equipment according to an embodiment of the present invention.

As shown in FIG. 4, in an application scenario provided in an embodiment of the present invention, the access control information of the user equipment is specifically subscription data corresponding to a PLMN ID in a PLMN list. An access control method for a user equipment is introduced in detail below. The method includes the following steps.

301. A mobility management network element sends a first message to a CSG server, where the first message includes a PLMN list.

The PLMN list can be a PLMN list that is configured by an operator on the mobility management network element and supported by the mobility management network element, or a subset of the PLMN list; and may include a list of all PLMNs that are equivalent to a PLMN to which the mobility management entity belongs (equivalent PLMN list) or its subset, a list of all PLMNs that have a roaming agreement with the PLMN of the mobility management network element or its subset, or a list of all PLMNs that belong to the same operator as the PLMN of the mobility management network element belongs to or its subset. If the mobility management network element supports network sharing, the PLMN list may also be a list of all PLMNs that are supported by the mobility management network element or its subset. The PLMN list may also be a combination of the preceding lists.

The PLMN list may further include: a PLMN ID to which a UE belongs, where the PLMN ID is obtained by the mobility management network element from an IMSI (international mobile subscriber identity) of the UE. For example, the mobility management network element obtains an MCC (mobile country code) and an MNC (mobile network code) from the IMSI code and constructs PLMN ID=MCC+MNC); or a PLMN ID to which a CSG accessed by a user belongs, where the PLMN ID may be reported by an access network element to the mobility management network element before the mobility management network element obtains subscription data from the CSG server.

Specifically, the mobility management network element sends a message to the CSG server, the PLMN to which the mobility management network element belongs is included in a Host Name field of a message header, and the PLMN list is included in a message body instead of the message header and is sent to the CSG server.

It should be noted that in this step, the first message including the PLMN list may also be sent to a home location register, and the CSG server in all subsequent steps may be replaced with the home location register.

For example, a source mobility management network element sends an update location request message to the CSG server, where the location update request message includes the PLMN list.

302. The CSG server receives the first message that is sent by the mobility management network element and includes the PLMN list, and obtains, from preconfigured user subscription data, subscription data corresponding to a PLMN ID in the PLMN list.

Particularly, if the message body of the first message does not include a PLMN ID, the CSG server obtains subscription data corresponding to all preconfigured PLMN IDs.

The preceding preconfigured user subscription data may be deployed by an operator on the CSG server.

303. The CSG server sends a second message to the mobility management network element, where the second message includes the subscription data corresponding to the PLMN ID in the PLMN list.

Particularly, if the message body of the first message does not include a PLMN ID, the CSG server includes, in the second message, subscription data corresponding to all PLMN IDs.

In the present invention, the subscription data may specifically be regional roaming restriction subscription data (Regional Subscription Data or Regional Subscription Information), CSG subscription data (CSG-Subscription-Data), or a combination of both, where the CSG subscription data includes a list of CSGs which the user is allowed to access. This is not described in detail in other embodiments.

For example, if the mobility management network element uses the MAP protocol to interact with the CSG server, the CSG server receives a PLMN list sent by the source mobility management network element, and sends an insert subscriber data message (Insert Subscriber Data/Acknowledge) to the source mobility management network element, where the insert subscriber data message includes subscription data corresponding to a PLMN ID in the PLMN list.

For another example, if the mobility management network element does not uses the MAP protocol, the CSG server sends an update location acknowledge message to the source mobility management entity, where the update location acknowledge message includes subscription data corresponding to a PLMN ID in a PLMN list.

304. The mobility management network element receives the second message that is sent by the CSG server and includes the subscription data corresponding to the PLMN ID in the PLMN list.

305. The mobility management network element obtains, from the subscription data corresponding to the PLMN ID in the PLMN list, subscription data corresponding to a PLMN ID of a target cell, and performs access control on the user equipment according to the subscription data corresponding to the PLMN ID of the target cell (refer to content of the first part below). Alternatively, the mobility management network element may send, to the access network element, the subscription data corresponding to the PLMN ID in the PLMN list (refer to content of the second part below).

Specific example will be provided beginning with a first part.

When the source mobility management network element receives a handover request message that is sent by the access network element and includes target access information, where the target access information can be one or more of a CSG ID of a target cell to be accessed by the user, an access mode of a target access network element, an ID of the target cell, and a tracking area/routing area corresponding to the target cell. The mobility management network element obtains a PLMN ID of the target cell from the ID of the target cell or a code of the tracking area/routing area; and specifically, obtains an MCC (mobile country code, mobile country code) and an MNC (mobile network code, mobile network code) that are included in the code of the target cell/tracking area or routing area. The mobility management network element may construct a PLMN ID by using the preceding MCC and MNC and according to PLMN ID=MCC+MNC.

The subscription data corresponding to the PLMN ID of the target cell is obtained from the subscription data corresponding to the PLMN ID in the PLMN list.

In a practical application, the performing access control on the user equipment according to the subscription data that corresponds to the PLMN ID of the target cell and is included in the second message is specifically as follows.

According to the regional roaming restriction subscription data, it is judged whether the user can access the ID of the target cell or the code of the tracking area/routing area. If the user can access or hand over to the target cell, the mobility management network element performs a handover procedure to hand over the user to the target cell and prepares a handover resource. If the user cannot access or hand over to the target cell, the mobility management cell cancels or refuses the handover procedure or notifies the access network element of a handover failure.

According to its CSG subscription data, and according to the CSG ID of the target cell or both the CSG ID of the target cell and an access mode of the target cell that are sent by a source access network element and received by the mobility management network element, the mobility management network element judges, according to CSG subscription data corresponding to the PLMN ID of the target cell, whether the user can access the target cell. Specifically:

If the target cell is a CSG (closed mode) cell and the CSG ID of the target cell is included in an allowed CSG list of the user equipment, the user equipment is allowed to access/hand over to the target cell. The mobility management network element continues to perform a handover procedure to hand over the user equipment to the target cell. In this case, if a mobility management network element serving the user equipment changes, the mobility management network element sends a forward handover request to a target mobility management network element; if the mobility management network element serving the user equipment remains unchanged, the mobility management network element performs a subsequent handover step and allocates a target resource such as a target cell resource.

If the target access network element is in closed mode and the CSG ID of the target cell is not included in the allowed CSG list of the user equipment, the user is not allowed to hand over to the target cell. In this case, the source mobility management network element refuses a handover and sends a handover failure message to the source access network element.

The second part of the example will now be described.

The access network element receives subscription data of the user, and before sending a handover request, the access network element makes a judgment.

When the PLMN ID of the target cell is different from a PLMN ID of a cell that is currently accessed by the user: if the access network element judges, according to target area information and the subscription data corresponding to the PLMN ID of the target cell, that the user is allowed to access the target area, the access network element sends the handover request to the mobility management network element to hand over the user to the target cell; otherwise, no handover procedure is performed.

Specifically, the target cell information specifically refers to an ID of the target cell, or an ID of a target tracking area (TA, tracking area), or an ID of a target routing area (RA, routing area), or an ID of a target location area (LA, location area), or an ID of a target CSG, or an ID of a target CSG and an access mode.

This embodiment is illustrated by using the ID of the target CSG as an example. the access network element obtains CSG subscription data corresponding to the PLMN of the target cell. If the ID of the target CSG is included in an allowed CSG list of the user, the user is allowed to access or hand over to the target cell, and the access network element initiates a handover procedure and sends a handover request message to the mobility management network element to hand over the user to the target cell. If the ID of the target CSG is not included in the CSG list of the user, the user is not allowed to access the target cell or hand over to the target cell, and the access network element stops the handover procedure or hands over the user to another cell.

It should be noted that there is no time sequence relationship between the preceding steps 301-303 and steps 304 and 305. The inventive point of this embodiment is that, before a handover procedure, a mobility management network element obtains subscription data of multiple PLMNs from a home subscriber server so as to perform access control on a user in a subsequent handover procedure.

A beneficial effect brought by the embodiment of the present invention is as follows: The mobility management network element in the embodiment of the present invention can obtain subscription data corresponding to multiple PLMN IDs from a home subscriber server and obtain, from the subscription data of multiple PLMNs, the subscription data corresponding to the PLMN ID of the target cell. If the PLMN ID of the target cell to which the user hands over is different from a PLMN ID of a source cell where the user is currently located, the mobility management network element can perform access control on the user in time. It is ensured that the user equipment smoothly hands over to the target cell in time when the user equipment is allowed to access the target cell. It is also ensured that the target cell does not allocate a resource for the user equipment if the user equipment is not allowed to access the target cell, thereby avoiding a waste of a cell resource, while shortening time for the access network element to hand over the user equipment to another cell.

Figure 5:
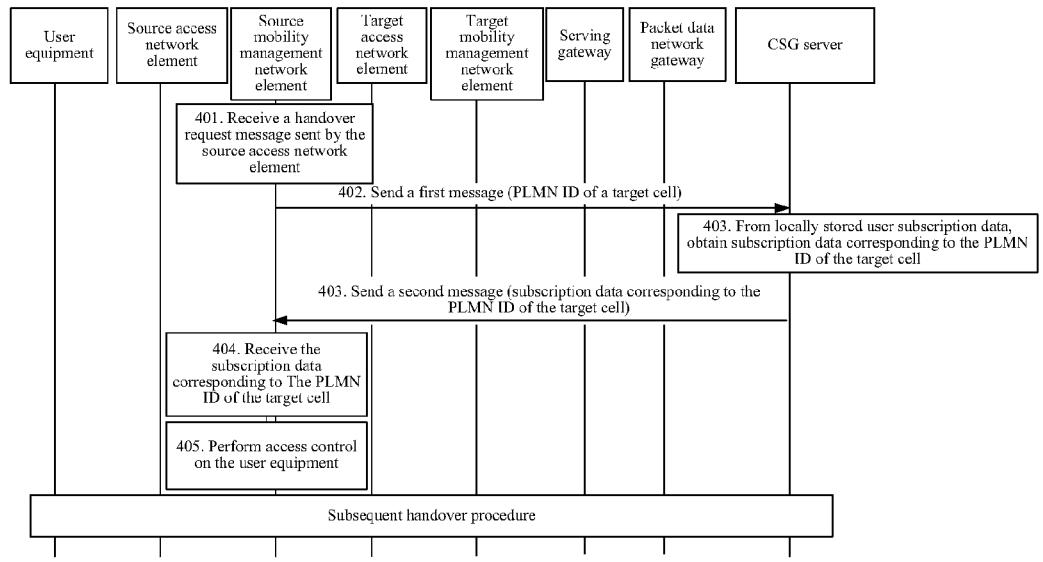
FIG. 5 is a flowchart of another access control method for a user equipment according to an embodiment of the present invention.

As shown in FIG. 5, in an application scenario provided in an embodiment of the present invention, the access control information of the user equipment is specifically subscription data corresponding to a PLMN ID of a target cell. An access control method for a user equipment is introduced in detail below. The method includes the following steps.

401. A source mobility management network element receives a handover request message that is sent by an access network element and includes target access information, where the target access information can be one or more of a CSG ID of a target cell to be accessed by a user, an access mode of a target access network element, an ID of the target cell, and a tracking area/routing area corresponding to the target cell. The source mobility management network element obtains a PLMN ID of the target cell from the ID of the target cell or a code of the tracking area/routing area; and specifically, obtains an MCC (mobile country code, mobile country code) and an MCC (mobile network code, mobile network code) that are included in the code of the target cell/tracking area or routing area. The source mobility management network element may construct a PLMN ID by using the preceding MCC and MNC and according to PLMN ID=MCC+MNC.

402. If a PLMN ID currently accessed by the user equipment is different from the PLMN ID of the target cell, the source mobility management network element sends, to a CSG server, a first message including the PLMN ID of the target cell. The PLMN ID currently accessed by the user equipment includes a PLMN ID of a source cell where the user equipment is currently located or a PLMN ID of a mobility management network element. Before sending the first message, the source mobility management network element may further judge whether the target cell is a CSG cell (a cell in closed mode) or a hybrid (hybrid) cell (a cell in hybrid mode). If it is judged that the target cell is a cell in closed mode or a cell in hybrid mode, the source mobility management network element sends, to the CSG server, the first message including the PLMN ID of the target cell.

Specifically, the PLMN ID of the target cell is included in a message body of the first message.

403. The CSG server receives the first message that is sent by the source mobility management network element and includes the PLMN ID of the target cell, and obtains, from preconfigured user subscription data, subscription data corresponding to the PLMN ID of the target cell. The CSG server sends a second message to the source mobility management network element, where the second message includes the subscription data corresponding to the PLMN ID of the target cell.

It should be noted that in the present invention, the subscription data may specifically be regional roaming restriction subscription data (Regional-Subscription-Information or Regional-Subscription-Data), CSG subscription data (CSG-Subscription-Data), or a combination of both, where the CSG subscription data includes a list of CSGs which the user is allowed to access. This is not described again in detail in other embodiments.

404. The source mobility management network element receives the second message that is sent by the CSG server and includes the subscription data corresponding to the PLMN ID of the target cell.

405. Perform access control on the user equipment according to the subscription data corresponding to the PLMN ID of the target cell. Specifically:

According to the regional roaming restriction subscription data, the source mobility management network element judges, according to the regional roaming restriction subscription data provided by a CSS, whether the user equipment can access the ID of the target cell or the code of the tracking area/routing area. If can access, the source mobility management network element performs a handover procedure to hand over the user to the target cell; if cannot access, the source mobility management network element cancels or refuses the handover procedure or notifies the source access network element of a handover failure.

According to the CSG subscription data and according to the CSG ID of the target cell or both the CSG ID of the target cell and the access mode of the target access network element that are sent by the source access network element and received by the source mobility management network element, the source mobility management network element judges, according to the CSG subscription data corresponding to a PLMN ID of the target cell, whether the user can access the target cell.

If the target cell is a CSG cell (a cell in closed mode) or a hybrid (hybrid) cell (a cell in hybrid mode), and the CSG ID of the target cell is included in an allowed CSG list of the user equipment, the user equipment is allowed to hand over to the target cell. In this case, if a mobility management network element serving the user equipment changes, the source mobility management network element sends a forward handover request to a target mobility management network element; if the mobility management network element serving the user equipment remains unchanged, the source mobility management network element performs a subsequent handover step and allocates a target resource such as a target cell resource.

If the target cell is a CSG cell (a cell whose access mode is closed mode), and the CSG ID of the target cell is not included in the allowed CSG list of the user equipment, the user is not allowed to access/hand over to the target cell. In this case, the source mobility management network element sends a handover failure message to the source access network element and refuses a handover.

A beneficial effect brought by the embodiment of the present invention is as follows: The mobility management network element in the embodiment of the present invention can obtain, from a home subscriber cell, the subscription data corresponding to the PLMN ID of the target cell. If the PLMN ID of the target cell to which the user hands over is different from the PLMN ID of the source cell where the user is currently located, the mobility management network element can perform access control on the user in time. It is ensured that the user equipment smoothly hands over to the target cell in time when the user equipment is allowed to access the target cell. It is also ensured that the target cell does not allocate a resource for the user equipment if the user equipment is not allowed to access the target cell, thereby avoiding a waste of a cell resource, while shortening time for the access network element to hand over the user equipment to another cell.

Figure 6:
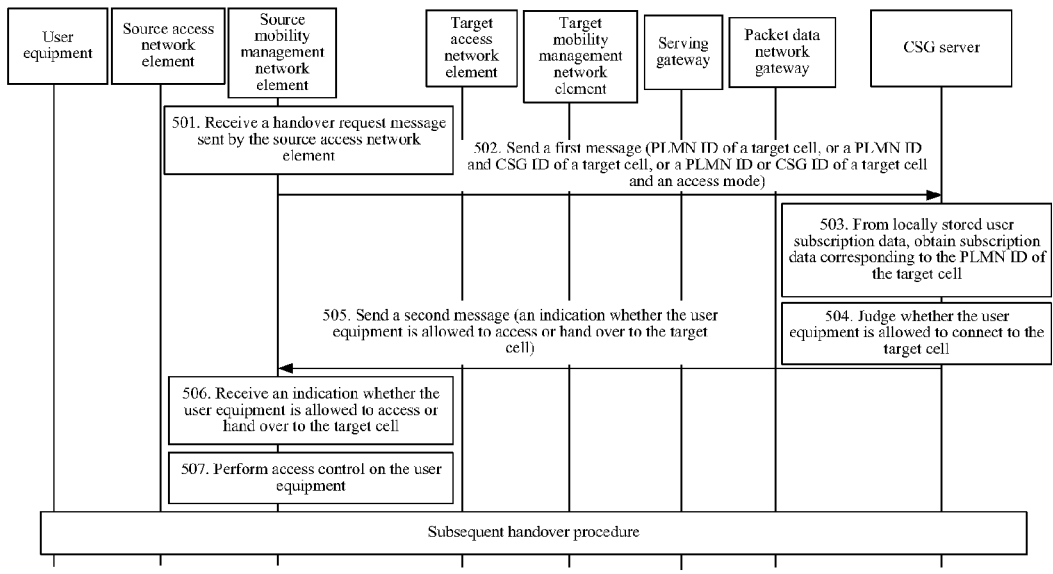
FIG. 6 is a flowchart of another access control method for a user equipment according to an embodiment of the present invention.

As shown in FIG. 6, in an application scenario provided by an embodiment of the present invention, the access control information of the user equipment is specifically indication information indicating whether to access the target cell. An access control method for a user equipment is introduced in detail below. The method includes the following steps.

501. A source mobility management network element receives a handover request message that is sent by an access network element and includes target access information. The target access information can be one or more of a CSG ID of a target cell to be accessed by a user, an access mode of a target access network element, an ID of the target cell, and a tracking area/routing area corresponding to the target cell. The source mobility management network element obtains a PLMN ID of the target cell from the ID of the target cell or a code of the tracking area/routing area. Specifically, obtains an MCC and an MNC that are included in the code of the target cell/tracking area or routing area. The source mobility management network element may construct a PLMN ID by using the preceding MCC and MNC and according to PLMN ID=MCC+MNC.

502. If a PLMN ID currently accessed by the user equipment (The PLMN ID currently accessed by the user equipment includes a PLMN ID of a source cell where the user equipment is currently located or a PLMN ID of the source mobility management network element) is different from the PLMN ID of the target cell, the source mobility management network element sends, to a CSG server, a first message that includes the PLMN ID of the target cell, or includes the PLMN ID and CSG ID of the target cell, or includes the PLMN ID and CSG ID of the target cell and the access mode of the target access network element. Before sending the message, the mobility management network element may further judge whether the target cell is a CSG cell (a cell whose access mode is closed mode) or a hybrid (hybrid) cell (a cell whose access mode is hybrid mode).

503. The CSG server receives the first message sent by the source mobility management network element, and obtains, from preconfigured user subscription data, subscription data corresponding to the PLMN ID of the target cell.

The subscription data may specifically be regional roaming restriction subscription data (Regional Subscription Information or Regional Subscription Data), or CSG subscription data (CSG-Subscription-Data), where the CSG subscription data includes a list of CSGs which the user is allowed to access. This is not described again in detail in other embodiments.

504. According to information provided by the mobility management network element and the subscription data corresponding to the PLMN ID, the CSG server judges whether the UE is allowed to access the target cell, and indicates, to the mobility management network element, whether the UE is allowed to access the target cell. Specifically:

If the source mobility management network element sends, to the CSG server, a first message including the PLMN ID and CSG ID of the target cell in step 502, this step is specifically performed in the following manner if the CSG ID provided by the mobility management network element is in a list that corresponds to a PLMN and is of CSGs which the user is allowed to access, the user is allowed to access or hand over to the target cell, and if the CSG ID provided by the mobility management network element is not in the list that corresponds to the PLMN and is of CSGs which the user is allowed to access, the user is not allowed to access or hand over to the target cell.

If the source mobility management network element sends, to the CSG server, a first message including the PLMN ID and CSG ID of the target cell and the access mode of the target access network element in step 502, this step is specifically performed in the following manner if the target cell is a CSG cell (a cell whose access mode is closed mode) or a hybrid (hybrid) cell (whose access mode is hybrid mode), and the CSG ID of the target cell is in an allowed CSG list of the user equipment (the allowed CSG list of the user equipment is obtained in step 503), the user equipment is allowed to hand over to the target cell, and that the UE can access the target cell is indicated to the mobility management network element; if the target cell is a CSG cell (a cell whose access mode is closed mode), and the CSG ID of the target cell is not in the allowed CSG list of the user equipment, that the UE cannot access the target cell is indicated to the mobility management network element.

If the source mobility management network element sends, to the CSG server, a first message including the PLMN ID of the target cell in step 502, this step is specifically performed in the following manner the CSG server judges, according to the regional roaming restriction subscription data in user subscription data, whether the user can access the target cell. For example, if there is a roaming agreement in a PLMN of the target cell and a PLMN to which the user belongs (that is, a PLMN included in an IMSI (International Mobile Subscriber Identity) of the user), the user can access the target cell; otherwise, the user cannot access the target cell.

505. The CSG server sends a second message to the source mobility management network element, where the second message includes indication information, where the indication information indicates, to the mobility management network element, whether the UE is allowed to access/hand over to the target cell.

Specifically, optionally, an implementation manner of indication is to use a message name; for example, subscriber data ack is used to indicate that the user equipment is allowed to access a target cell, and subscriber data reject is used to indicate that the user equipment is not allowed to access the target cell. Or Optionally, another implementation manner is that: a message is sent to the source mobility management network element, where the message includes an indication information element and the information element is set to a particular value to indicate whether the user equipment is allowed to access the target cell; for example, 1 indicates that the user equipment can access the target cell, and 0 indicates that the user equipment cannot access the target cell. Alternatively, still another implementation manner is that: the CSG server may also adopt a manner of including an indication information element in the message, to indicate that the user equipment is allowed to access the target cell, and adopt a manner of not including an indication information element in the message, to indicate that the user equipment is not allowed to access the target cell, and vice versa.

506. The source mobility management network element receives the second message that is sent by the CSG server and includes the indication information indicating whether the user equipment is allowed to access/hand over to the target cell.

507. Perform access control on the user equipment according to the indication information indicating whether to access the target cell.

Specifically, if the indication information indicating whether to access the target cell is specifically an indication that the user equipment is allowed to access/hand over to the target cell, the mobility management network element performs a handover procedure to hand over the user to the target cell. In this case, if a mobility management network element serving the user equipment changes, the source mobility management network element sends a forward handover request to a target mobility management network element; if the mobility management network element serving the user equipment remains unchanged, the source mobility management network element performs a subsequent handover step and allocates a target resource such as a target cell resource.

If the indication information indicating whether to access the target cell is specifically an indication that the user equipment is not allowed to access/hand over to the target cell, the mobility management network element performs a handover procedure to hand over the user to the target cell.

A beneficial effect brought by the embodiment of the present invention is as follows: the mobility management network element in the embodiment of the present invention may obtain, from a CSG server, the indication information indicating whether to access the target cell. If the PLMN ID of the target cell to which the user hands over is different from the PLMN ID of the source cell where the user is currently located, the mobility management network element can perform access control on the user in time. It is ensured that the user equipment smoothly hands over to the target cell in time if the user equipment is allowed to access the target cell. It is also ensured that the target cell does not allocate a resource for the user equipment if the user equipment is not allowed to access the target cell, thereby avoiding a waste of a cell resource, while shortening time for the access network element to hand over the user equipment to another cell.

Figure 7:
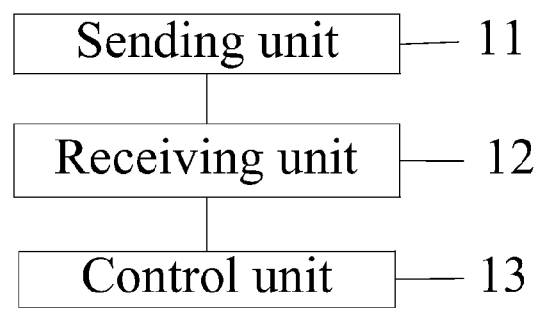
FIG. 7 is a structural block diagram of a mobility management network element according to an embodiment of the present invention.

As shown in FIG. 7, an embodiment of the present invention further provides a mobility management network element, including a sending unit 11, a receiving unit 12, and a control unit 13, where the sending unit 11 sends a first message to a CSG server; the receiving unit 12 is configured to receive a second message that is sent by the CSG server and includes access control information of a user equipment, and the control unit 13 is configured to, according to the access control information of the user equipment, perform access control on the user equipment or send the access control information of the user equipment to an access network element.

It should be noted that the first message includes a PLMN list or a PLMN ID of a target cell or does not include a PLMN ID.

Further, when the access control information of the user equipment is specifically subscription data corresponding to a PLMN ID in a PLMN list (reference may be made to relevant description in the access control method for the user equipment shown in FIG. 4), the first message sent by the sending unit 11 includes the PLMN list; and the second message received by the receiving unit 12 includes the subscription data corresponding to the PLMN ID in the PLMN list; or the first message does not include a PLMN ID, and the access control information of the user equipment in the second message received by the receiving unit 12 is specifically subscription data corresponding to all PLMN IDs preconfigured on the CSG server.

Figure 8:
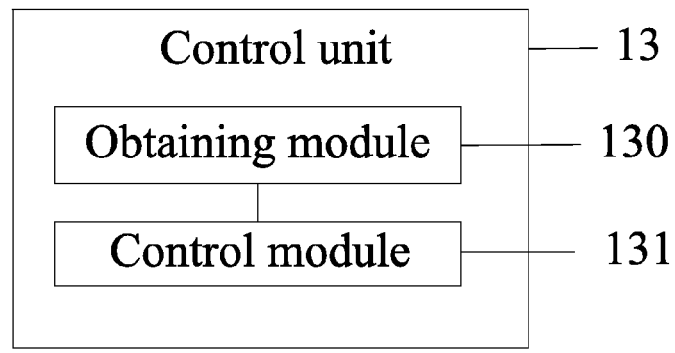
FIG. 8 is a structural block diagram of a control unit 13 in a mobility management network element according to an embodiment of the present invention.

As shown in FIG. 8, the control unit 13 of the mobility management network element includes an obtaining module 130 and a control module 131.

The obtaining module 130 is configured to obtain subscription data corresponding to a PLMN ID of the target cell, from the received subscription data corresponding to the PLMN ID in the PLMN list, or from the subscription data corresponding to all the PLMN IDs preconfigured on the CSG server, and the control module 131 is configured to perform the access control on the user equipment according to the subscription data corresponding to the PLMN ID of the target cell.

Optionally, after the control unit 13 sends the access control information of the user equipment to the access network element, the access network element performs the access control on the user equipment, according to the subscription data corresponding to the PLMN ID in the PLMN list, or according to the subscription data corresponding to all the PLMN IDs preconfigured on the CSG server.

The control unit 13 is specifically configured to: perform a handover procedure to hand over the user equipment to the target cell, when it is judged that the user equipment is allowed to access the target cell; or refuse a handover or send a handover failure message to the access network element, when it is judged that the user is not allowed to access the target cell or hand over to the target cell.

Further, when the access control information of the user equipment is specifically the subscription data corresponding to the PLMN ID of the target cell (reference may be made to relevant description in the access control method for the user equipment shown in FIG. 5), the first message sent by the sending unit 11 includes the PLMN ID of the target cell; and the second message received by the receiving unit 12 includes the subscription data corresponding to the PLMN ID of the target cell.

It should be noted that the subscription data includes regional roaming restriction subscription data or CSG subscription data, where the CSG subscription data includes a list of CSGs which the user equipment is allowed to access.

The sending unit 11 is specifically configured to send the first message to the CSG server when a PLMN ID currently accessed by the user equipment is different from the PLMN ID of the target cell, or send the first message to the CSG server when a PLMN ID currently accessed by the user equipment is different from the PLMN ID of the target cell and it is judged that the target cell is a cell in closed mode or a cell in hybrid mode.

Further, if the access control information of the user equipment is specifically indication information indicating whether to access the target cell (reference may be made to relevant description in the access control method for the user equipment shown in FIG. 6), the first message sent by the sending unit 11 includes the PLMN ID of the target cell; and the second message received by the receiving unit 12 includes indication information indicating whether access of the user equipment is allowed.

Optionally, the first message sent by the sending unit 11 further includes a CSG ID of a target cell.

Optionally, the first message sent by the sending unit 11 further includes a CSG ID of a target cell and an access mode of the target cell.

Figure 9:
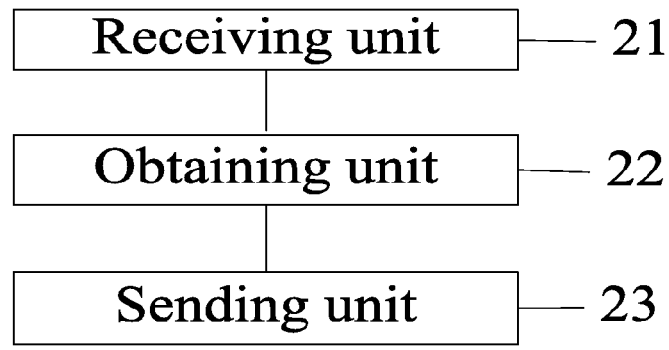
FIG. 9 is a structural block diagram of a CSG server according to an embodiment of the present invention.

As shown in FIG. 9, a CSG server saves user subscription data, and includes: a receiving unit 21, an obtaining unit 22, and a sending unit 23, where the receiving unit 21 is configured to receive a first message sent by a mobility management network element, the obtaining unit 22 is configured to obtain access control information of a user equipment according to preconfigured user subscription data, and the sending unit 23 is configured to send, to the mobility management network element, a second message including the access control information of the user equipment.

Further, if the access control information of the user equipment is specifically subscription data corresponding to a PLMN ID in a PLMN list (reference may be made to relevant description in the access control method for the user equipment shown in FIG. 4), the first message received by the receiving unit 21 includes the PLMN list; and the access control information of the user equipment that is obtained by the obtaining unit 22 includes the subscription data corresponding to the PLMN ID in the PLMN list, or if the first message does not include a PLMN ID, the access control information of the user equipment is specifically subscription data corresponding to all PLMN IDs preconfigured on the CSG server.

Further, if the access control information of the user equipment is specifically subscription data corresponding to a PLMN ID of a target cell (reference may be made to relevant description in the access control method for the user equipment shown in FIG. 5), the first message received by the receiving unit 21 includes the PLMN ID of the target cell; and the access control information of the user equipment that is obtained by the obtaining unit 22 includes the subscription data corresponding to the PLMN ID of the target cell.

It should be noted that the subscription data includes regional roaming restriction subscription data or CSG subscription data, where the CSG subscription data includes a list of CSGs which a user equipment is allowed to access.

Further, if the access control information of the user equipment is specifically indication information indicating whether to access the target cell (reference may be made to relevant description in the access control method for the user equipment shown in FIG. 6), the first message received by the receiving unit 21 includes a PLMN ID of a target cell; and the access control information of the user equipment that is obtained by the obtaining unit 22 includes an indication whether the user equipment is allowed to access or hand over to the target cell.

Figure 10:
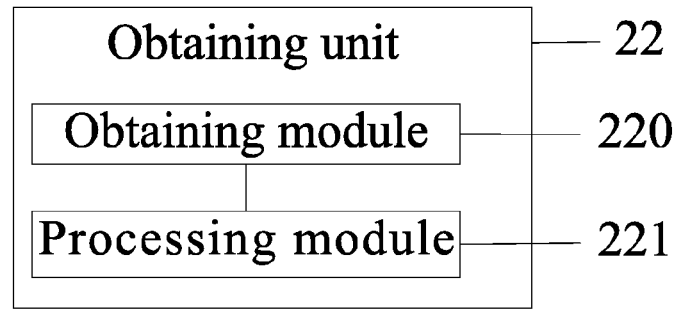
FIG. 10 is a structural block diagram of an obtaining unit 22 in a CSG server according to an embodiment of the present invention.

Specifically, as shown in FIG. 10, the obtaining unit 22 in the CSG server includes: an obtaining module 220 and a processing module 221, where, the obtaining module 220 is configured to obtain, from the preconfigured user subscription data, the subscription data corresponding to the PLMN ID of the target cell, and the processing module 221 is configured to determine, according to the subscription data corresponding to the PLMN ID of the target cell, the indication whether the user equipment is allowed to access or hand over to the target cell.

The mobility management network element in the embodiment of the present invention may obtain, from a home subscriber server, the subscription data corresponding to the PLMN ID of the target cell. If the PLMN ID of the target cell to which a user hands over is different from a PLMN ID of a source cell where the user is currently located, the mobility management network element can perform access control on the user in time. It is ensured that the user equipment smoothly hands over to the target cell in time if the user equipment is allowed to access the target cell. It is also ensured that the target cell does not allocate a resource for the user equipment if the user equipment is not allowed to access the target cell, thereby avoiding a waste of a cell resource, while shortening time for an access network element to hand over the user equipment to another cell.

The embodiments of the present invention are mainly applied in a process of performing access control on the user equipment, and may solve a problem in the prior art that the mobility management network element cannot perform the access control on a UE when a PLMN corresponding to a cell where the UE is currently located is different from a PLMN corresponding to a target cell to be accessed by the UE.

The foregoing descriptions are merely specific implementation manners of the present invention, but not intended to limit the protection scope of the present invention. Any variation or replacement easily figured out by persons skilled in the art within the technical scope disclosed in the present invention shall all fall within the protection scope of the present invention. Therefore, the protection scope of the present invention shall be subject to the protection scope of the claims.

What is claimed is:

1. An access control method for a user equipment to handover from a source network to a target network, the method comprising:
   sending, by a source mobility management network element in the source network, a first message to a closed subscriber group (CSG) server, wherein the first message comprises a public land mobile network (PLMN) list;
   receiving, by the source mobility management network element, a second message that is sent by the CSG server and comprises access control information of the user equipment, the access control information of the user equipment including subscription data corresponding to a PLMN ID of a target cell in the PLMN list, wherein the target cell is in the target network, and wherein the subscription data comprises CSG subscription data;
   obtaining, by the source mobility management network element, the subscription data corresponding to the PLMN ID of the target cell from the access control information; and
   determining, by the source mobility management network element, whether to allow the user equipment to handover to the target cell according to the subscription data corresponding to the PLMN ID of the target cell.

2. The method according to claim 1, wherein the CSG subscription data comprises a list of CSGs that a user is allowed to access.

3. The method according to claim 1, wherein the PLMN list comprises any one or a combination of the following: a list of PLMNs that are supported by the source mobility management network element or a subset of the PLMN list, a list of PLMNs that are equivalent to a PLMN to which the source mobility management network element belongs, a list of PLMNs that have a roaming agreement with a PLMN of the source mobility management network element, or a list of PLMNs that belong to a same operator as a PLMN of the source mobility management network element; and if the source mobility management network element supports network sharing, the PLMN list is the list of the PLMNs that are supported by the source mobility management network element.

4. The method according to claim 1, wherein the method further comprises performing a handover procedure to hand over the user equipment to the target cell, when the user equipment is allowed to access the target cell.

5. A source mobility management network element in a source network, comprising:
   a processor; and
   a non-transitory computer-readable storage medium coupled to the processor and storing programming for execution by the processor, wherein the programming, when executed by the processor, configures the mobility management network element to:
   send a first message to a closed subscriber group (CSG) server, wherein the first message comprises a public land mobile network (PLMN) list;

receive a second message that is sent by the CSG server and comprises access control information of a user equipment, the access control information of the user equipment including subscription data corresponding to a PLMN ID of a target cell in the PLMN list if the user equipment hands over from the source network to a target network, wherein the target cell is in the target network, and wherein the subscription data comprises CSG subscription data;

obtain the subscription data corresponding to the PLMN ID of the target cell from the access control information; and determine whether to allow the user equipment to handover to the target cell according to the subscription data corresponding to the PLMN ID of the target cell.

6. The source mobility management network element according to claim 5, wherein the CSG subscription data comprises a list of CSGs which a user is allowed to access.

7. The source mobility management network element according to claim 5, wherein the first message comprises a PLMN list and the PLMN list comprises any one or a combination of the following: a list of PLMNs that are supported by the source mobility management network element or a subset of the PLMN list, a list of PLMNs that are equivalent to a PLMN to which the source mobility management network element belongs, a list of PLMNs that have a roaming agreement with a PLMN of the source mobility management network element, or a list of PLMNs that belong to a same operator as a PLMN of the source mobility management network element, and a list of all the PLMNs that are supported by the source mobility management network element if the source mobility management network element supports network sharing.

8. The method according to claim 1, wherein the method further comprises refusing a handover or sending a handover failure message to an access network element, when the user equipment is not allowed to access the target cell or hand over to the target cell.

9. The source mobility management network element according to claim 5, wherein the programming, when executed by the processor, configures the mobility management network element to perform a handover procedure to hand over the user equipment to the target cell, when the user equipment is allowed to access the target cell.

10. The source mobility management network element according to claim 5, wherein the programming, when executed by the processor, configures the mobility management network element to refuse a handover or send a handover failure message to an access network element, when the user equipment is not allowed to access the target cell or hand over to the target cell.

11. The source mobility management network element according to claim 5, wherein the mobility management network element comprises a Mobility Management Entity (MME).

12. The source mobility management network element according to claim 5, wherein the mobility management network element comprises a Serving GPRS Supporting Node (SGSN).

* * * * *